(12) United States Patent
Conners

(10) Patent No.: US 11,794,686 B2
(45) Date of Patent: Oct. 24, 2023

(54) DEPLOYABLE DECOY VEHICLE SYSTEM

(71) Applicant: Toyota Motor Engineering & Manufacturing North America, Inc., Plano, TX (US)

(72) Inventor: Joseph T. Conners, Royal Oak, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 219 days.

(21) Appl. No.: 17/083,157

(22) Filed: Oct. 28, 2020

(65) Prior Publication Data

US 2022/0126781 A1    Apr. 28, 2022

(51) Int. Cl.
*B60R 21/36*   (2011.01)
*B60R 21/0134*   (2006.01)

(52) U.S. Cl.
CPC .......... *B60R 21/36* (2013.01); *B60R 21/0134* (2013.01)

(58) Field of Classification Search
CPC .... B60R 21/36; B60R 21/0134; B60R 19/205
See application file for complete search history.

(56) References Cited

U.S. PATENT DOCUMENTS

| | | | |
|---|---|---|---|
| 5,942,716 A * | 8/1999 | Miller | F41H 3/02 89/36.17 |
| 6,106,038 A | 8/2000 | Dreher | |
| 6,923,483 B2 * | 8/2005 | Curry | B60R 19/205 180/274 |
| 6,950,014 B2 * | 9/2005 | Rao | B60R 21/0134 340/438 |
| 7,495,550 B2 | 2/2009 | Huang et al. | |
| 7,784,817 B2 | 8/2010 | Choi et al. | |
| 9,139,149 B2 * | 9/2015 | Lee | B60R 21/013 |
| 9,182,942 B2 | 11/2015 | Kelly et al. | |
| 10,336,290 B1 * | 7/2019 | Lazaro | B60R 21/36 |
| 10,697,856 B2 * | 6/2020 | Silberling | G01M 17/007 |
| 11,294,344 B2 * | 4/2022 | Hyde | A41D 13/05 |
| 2003/0030552 A1 | 2/2003 | Tonkin | |
| 2008/0067821 A1 * | 3/2008 | Mraz | B60R 19/205 293/107 |
| 2009/0218157 A1 | 9/2009 | Rammer | |
| 2017/0197573 A1 * | 7/2017 | Rastegar | B60R 19/205 |
| 2017/0315022 A1 * | 11/2017 | Simader | F21V 33/00 |
| 2020/0324760 A1 * | 10/2020 | Lee | B60W 30/18163 |

FOREIGN PATENT DOCUMENTS

| | | |
|---|---|---|
| JP | 2006510519 A | 3/2006 |
| KR | 200487346 Y1 | 9/2018 |

* cited by examiner

*Primary Examiner* — Drew J Brown
*Assistant Examiner* — Tiffany L Webb
(74) *Attorney, Agent, or Firm* — HAYNES AND BOONE, LLP

(57) ABSTRACT

A vehicle is provided that includes an airbag stored within an onboard compartment and inflatable by an onboard inflator. When inflated, the airbag extends from an outer surface of the vehicle, and has a shape that is recognizable, to a sensor on an approaching second vehicle, as at least a portion of a solid structure of the vehicle. The airbag is also configured to absorb at least some energy from a collision between the vehicle and the approaching second vehicle.

20 Claims, 7 Drawing Sheets

DEPLOYABLE DECOY VEHICLE SYSTEM

TECHNICAL FIELD

The subject matter described herein relates to a deployable decoy vehicle system that may reduce the chance and severity of vehicle-to-vehicle collisions. This deployable decoy vehicle system has particular but not exclusive utility for cars and trucks.

BACKGROUND

In motor vehicle crash avoidance and crash mitigation scenarios, the term "ego vehicle" may be used to refer to a vehicle for which countermeasures are incorporated or contemplated. The term "approaching vehicle" may refer to a vehicle that is approaching the ego vehicle and is, at least in principle, capable of colliding with the ego vehicle. Interior airbags have been used inside an ego vehicle to mitigate the impact of crashes to vehicle occupants. Such internal airbags may for example be deployed by a sodium azide inflator that is activated based on an accelerometer reading that detects the start of a collision event. In some cases, the inflator may be directly triggered by the accelerometer. In other cases, the inflator may be triggered by a processor or control unit in communication with an accelerometer or other sensor.

In newer vehicles, airbags may also be provided on the outside of the vehicle to mitigate the impact of pedestrians and other vehicles (e.g., by absorbing or dissipating at least some energy from the collision), thus reducing damage to the ego vehicle as well as the pedestrian or approaching vehicle. Such external airbags may for example be deployed by an inflator triggered by a processor or control unit that detects an impending collision based on inputs from one or more sensors, such as camera, sonar, lidar, radar, or proximity sensors.

It should be understood that current external airbags have numerous drawbacks, including but not limited to activation that can occur too late to fully mitigate a collision event. Accordingly, a need exists for improved collision mitigation systems that address the foregoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a collision mitigation system that deploys an inflatable decoy vehicle on the outside of the ego vehicle (e.g., from a compartment in the rear bumper), to mitigate an actual or predicted collision.

Automated Emergency Braking (AEB) systems in an approaching vehicle can take over control of the approaching vehicle's brakes and apply braking power when an imminent collision event is detected. However, collisions may still occur. Furthermore, if the ego vehicle detects the impending collision and deploys a standard external airbag (which may, for example, present a large, blank, white surface), the deployment of the external airbag may suddenly and dramatically alter the appearance of the ego vehicle, such that a vehicle identification process that executes in the approaching vehicle could be interrupted, affecting not only AEB systems but possibly other autonomous driving systems and driver-assist systems of the approaching vehicle as well. This may increase the likelihood and/or severity of a collision.

In a vehicle testing environment, AEB systems may be assessed by using an inflatable vehicle-like object or "decoy vehicle" towed behind an actual vehicle, or otherwise conveyed along a test track. Such decoy vehicles are inflated with an air pump providing continuous pressure to the decoy vehicle interior. The present disclosure combines the technology of external airbags with that of inflatable decoy vehicles to yield a deployable decoy vehicle system that includes an external airbag that, when inflated, resembles the ego vehicle, or a relevant portion of the ego vehicle. When an impending collision is detected, the deployable decoy vehicle can be rapidly inflated by a standard airbag inflator, such that an approaching vehicle will detect the ego vehicle as being in a closer position, and consequently its AEB will be triggered proportionally earlier, thus reducing the chance of vehicle contact and/or reducing the speed of contact if a collision occurs. Thus, by tricking the approaching vehicle's automated emergency braking system into reacting sooner to the ego vehicle, the deployable decoy vehicle system increases the effectiveness of the approaching vehicle's emergency braking system. As with a standard external airbag, in the event of a collision, the presence of the inflatable vehicle would help mitigate the effects/impact of the collision, beyond the benefit offered by the further reduction in speed. In an example, deployable decoy vehicle would be specifically designed to look like a radar target used for crash avoidance systems, with the intent of activating the approaching vehicle's crash avoidance systems earlier prior to impact.

The deployable decoy vehicle system disclosed herein has particular, but not exclusive, utility for crash avoidance or crash mitigation in cars and trucks. One general aspect of the deployable decoy vehicle system includes a vehicle, a compartment and an inflator disposed within the vehicle, and an airbag stored within the compartment and inflatable by the inflator. When inflated, the airbag extends from an outer surface of the vehicle, includes a shape recognizable, to a sensor on an approaching second vehicle, as at least a portion of a solid structure of the vehicle, and is configured to absorb at least some energy from a collision between the vehicle and the approaching second vehicle. Other embodiments of this aspect include corresponding computer systems, apparatus, and computer programs recorded on one or more computer storage devices, each configured to perform the actions of the methods.

Implementations may include one or more of the following features. In some embodiments, the sensor includes a processor. In some embodiments, the sensor includes a radar. In some embodiments, the sensor includes a lidar or sonar. In some embodiments, a coloration or patterning of the inflated airbag is recognizable, to the sensor, as at least the portion of the solid structure of the vehicle. In some embodiments, the sensor includes a camera. In some embodiments, the inflator is activated by a second sensor located on the vehicle. In some embodiments, the inflator is activated by a processor located on the vehicle in communication with a second sensor located on the vehicle. In some embodiments, the inflator is activated by the processor when the processor predicts that the collision between the vehicle and the approaching second vehicle will occur within a specified time. In some embodiments, the shape, recognizable to the sensor on the approaching second vehicle as at least the portion of the solid structure of the vehicle, is configured to trigger an automated response of the approaching second vehicle via the sensor on the approaching second vehicle. In some embodiments, the automated response is an emergency braking response. Implementations of the described techniques may include hardware, a method or process, or computer software on a computer-accessible medium.

One general aspect includes a system for protecting a vehicle. The system includes a vehicle, a sensor disposed within the vehicle, a processor in communication with the sensor, a compartment disposed within the vehicle, an inflator disposed within the vehicle and configured to be activated by the processor, an airbag stored within the compartment and inflatable by the inflator. When inflated, the airbag extends from an outer surface of the vehicle, includes a shape recognizable, to a second sensor on an approaching second vehicle, as at least a portion of a solid structure of the vehicle, and is configured to absorb at least some energy from a collision between the vehicle and the approaching second vehicle. Other embodiments of this aspect include corresponding computer systems, apparatus, and computer programs recorded on one or more computer storage devices, each configured to perform the actions of the methods.

Implementations may include one or more of the following features. In some embodiments, the second sensor includes a second processor. In some embodiments, the second sensor includes a radar, lidar, sonar, or camera. In some embodiments, a coloration or patterning of the inflated airbag is recognizable, to the second sensor, as at least the portion of the solid structure of the vehicle. In some embodiments, the inflator is activated by the processor when the processor predicts that the collision between the vehicle and the approaching second vehicle will occur within a specified time. In some embodiments, the shape recognizable to the second sensor is configured to trigger an automated response of the approaching second vehicle via the second sensor. In some embodiments, the automated response is an emergency braking response. Implementations of the described techniques may include hardware, a method or process, or computer software on a computer-accessible medium.

One general aspect includes a vehicle external airbag including a shape, pattern, or coloration recognizable to a sensor as a solid structure of a vehicle.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the deployable decoy vehicle system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
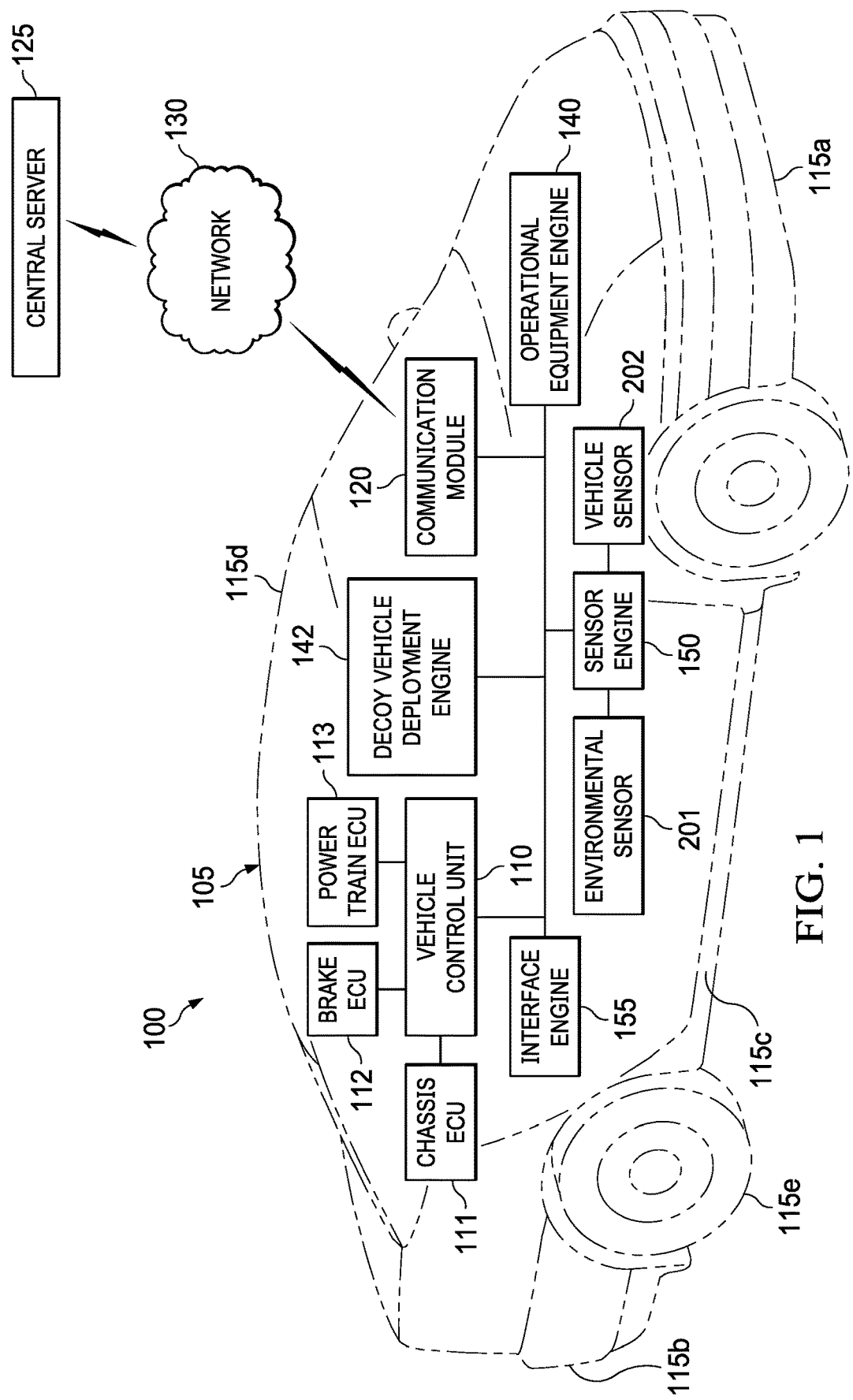
FIG. 1 is a diagrammatic illustration of a deployable decoy vehicle system in accordance with at least one embodiment of the present disclosure.

Disclosed is a collision mitigation system that functions by deploying an inflatable decoy vehicle on the outside of the ego vehicle. For example, the inflatable decoy vehicle may be deployed behind the ego vehicle, from a compartment in or near the rear bumper, to mitigate an actual or predicted rear-end collision, or may be deployed from the sides of the vehicle to mitigate a side-impact (e.g., broadside or T-bone) collision.

Automated Emergency Braking (AEB) systems are found in many modern vehicles, and are designed to take over control of the vehicle's brakes and apply braking power when a processor or control unit detects that a collision event is likely to occur without the braking. Such a detection may be based for example on distance and closing speed between the two vehicles. However, the reaction time of the system and the braking distance of the vehicle may be affected by weather, lighting, road conditions, and other factors, such that an approaching vehicle equipped with AEB may still collide with an ego vehicle. This presents a safety hazard as well as a risk of costly damage to both vehicles involved in the collision.

Furthermore, if the ego vehicle detects the impending collision and deploys an external airbag, the deployment of the external airbag (with, e.g., a large, featureless white surface) may suddenly and dramatically alter the appearance of the ego vehicle, such that a vehicle identification process that executes in the approaching vehicle could be interrupted, affecting not only AEB systems but possibly other autonomous driving systems and driver-assist systems of the approaching vehicle as well.

In a vehicle testing environment, to mitigate costs and safety risks during assessment testing, AEB systems may be assessed by using an inflatable vehicle-like object or "decoy vehicle" that is towed behind a real vehicle, carried by a wheeled scooter or dolly, or otherwise conveyed along a test track to serve as an ego vehicle. Thus, for example, during a rear impact test scenario, if the AFB system of the approaching vehicle initiates braking too late, the approaching vehicle will collide with the rear end of the inflatable decoy vehicle rather than with the rear end of an actual vehicle. Such decoy vehicles are inflated with an air pump providing continuous pressure to the decoy vehicle, thus keeping it inflated.

The present disclosure combines the technology of external airbags with that of inflatable decoy vehicles to yield a deployable decoy vehicle system, which includes an external airbag whose shape, coloration, and radar signature resembles that of the ego vehicle, or a relevant portion of the ego vehicle such as the read end or side. Such a deployable decoy vehicle may be stored in a collapsed state within a compartment of the ego vehicle, for example behind the rear bumper or within the vehicle roof. When an impending collision is detected by a processor or control unit of the ego vehicle, the deployable decoy vehicle can be rapidly inflated by a standard airbag inflator (e.g., a sodium azide inflator), such that the decoy vehicle appears to be a portion of the ego vehicle. Thus, an approaching vehicle will detect the ego vehicle as being in a closer position (e.g., further back or further to the side), and consequently the approaching vehicle's AEB (or other autonomous or driver-assist features) will be triggered proportionally earlier, thus reducing the chance of vehicle contact, and also reducing the speed of contact if a collision cannot be avoided.

Thus, by tricking the approaching vehicle's automated emergency braking system into reacting sooner to the ego vehicle, the deployable decoy vehicle system increases the effectiveness of the approaching vehicle's automated emergency braking system. In the event of a collision, the presence of the inflatable decoy vehicle can help mitigate damage and safety hazards of the collision, beyond the benefit offered by the further reduction in speed. In an example, the deployable decoy vehicle is an external airbag designed to look like the radar target used for crash avoidance systems, and also designed to visually resemble the ego vehicle in shape, coloration, and contours, such that camera, Hu, and sonar systems recognize the airbag as the ego vehicle. This may cause the approaching vehicle's crash avoidance systems (e.g., AEB, automatic lane change, etc.) to be activated earlier. This may (a) help to prevent the approaching vehicle from colliding with either the decoy vehicle or the ego vehicle, (b) cause the approaching vehicle to collide with the decoy vehicle but not the ego vehicle, or (c) if a collision between the approaching vehicle and the ego vehicle cannot be avoided, serve as an external airbag to distribute crash energy over a greater area and over a larger time period, thus reducing the severity of the crash. In some instances, the deployment of an inflatable decoy vehicle may also reduce the chance or severity of a collision with an approaching vehicle that is manually operated.

The present disclosure aids substantially in vehicle crash mitigation, by improving the braking response time and/or braking response distance of an approaching vehicle. Implemented on a processor in communication with one or more sensors, the deployable decoy vehicle system disclosed herein provides a practical means to trigger early braking by an approaching vehicle. This improved response to a possible impending collision transforms a standard crash scenario into a less dangerous scenario, without the normally routine need to alter the design of the approaching vehicle. This unconventional approach improves the functioning of the approaching vehicle, by making it more responsive to an impending collision. A control process of the deployable decoy vehicle system performs certain specific operations in response to different sensor inputs. Certain structures, functions, and operations of the processor are known in the art, while others are recited herein to enable novel features or aspects of the present disclosure with particularity.

These descriptions are provided for exemplary purposes only, and should not be considered to limit the scope of the deployable decoy vehicle system. Certain features may be added, removed, or modified without departing from the spirit of the claimed subject matter. For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a deployable decoy vehicle system in accordance with at least one embodiment of the present disclosure. In an example, a deployable decoy vehicle system is referred to by the reference numeral 100 and includes a vehicle 105, such as an automobile, and a vehicle control unit 110 located on the vehicle 105. The vehicle 105 may also be referred to herein as the control vehicle or ego vehicle, which are terms of art recognizable to a person of ordinary skill in the art. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may in some cases be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, or the interface engine 155 to at least partially control the interaction of data with and between the various components of the deployable decoy vehicle system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a decoy vehicle deployment engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
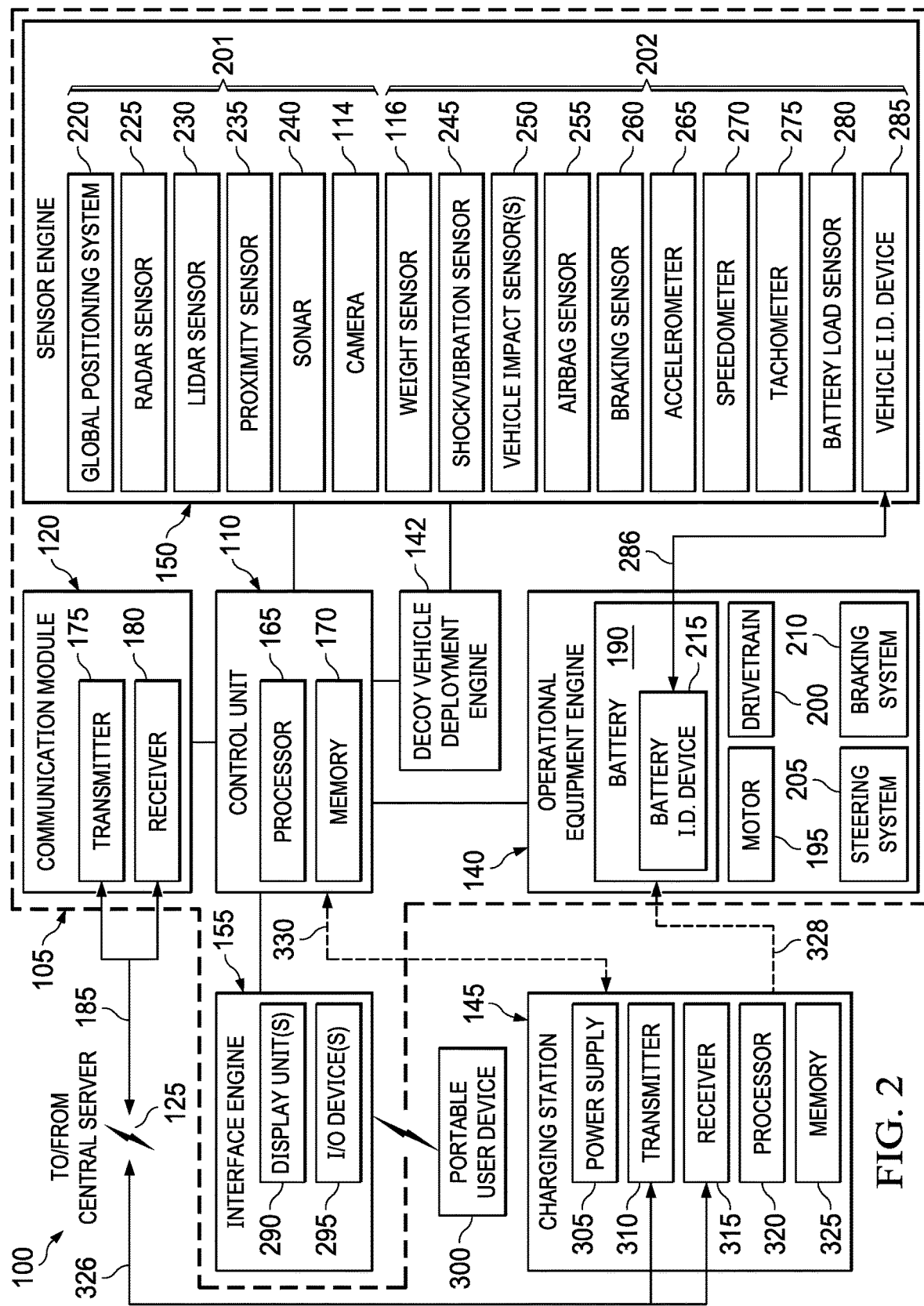
FIG. 2 is a diagrammatic illustration, in a block-diagram form, of at least a portion of the deployable decoy vehicle system of FIG. 1, in accordance with at least one embodiment of the present disclosure.

FIG. 2 is a diagrammatic illustration, in a block-diagram form, of at least a portion of the deployable decoy vehicle system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Such sensors may include, but are not limited to, angle sensors, rotary encoders, or linear encoders. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seat back, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The deployable decoy vehicle system 100 also includes a decoy vehicle deployment engine 142, the operation of which will be described below. In some embodiments, the decoy vehicle deployment engine 142 comprises a stand-alone housing with its own processor and memory. In other embodiments, the decoy vehicle deployment engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the decoy vehicle deployment engine 142 receives sensor data from one or more sensors (e.g., rear-facing sensors or side-facing sensors), which may for example be radar sensors 225, lidar sensors 230, proximity sensors 235, sonar sensors 240, cameras 114, load cells, linear encoders, rotary encoders, or other sensors 201 or 202 in order to determine the trailer angle.

A reader of ordinary skill in the art will understand that other components or arrangements of components may be found in a vehicle 105, and that the same general principles apply to electric vehicles, internal combustion vehicles, and hybrid vehicles.

Figure 3A:
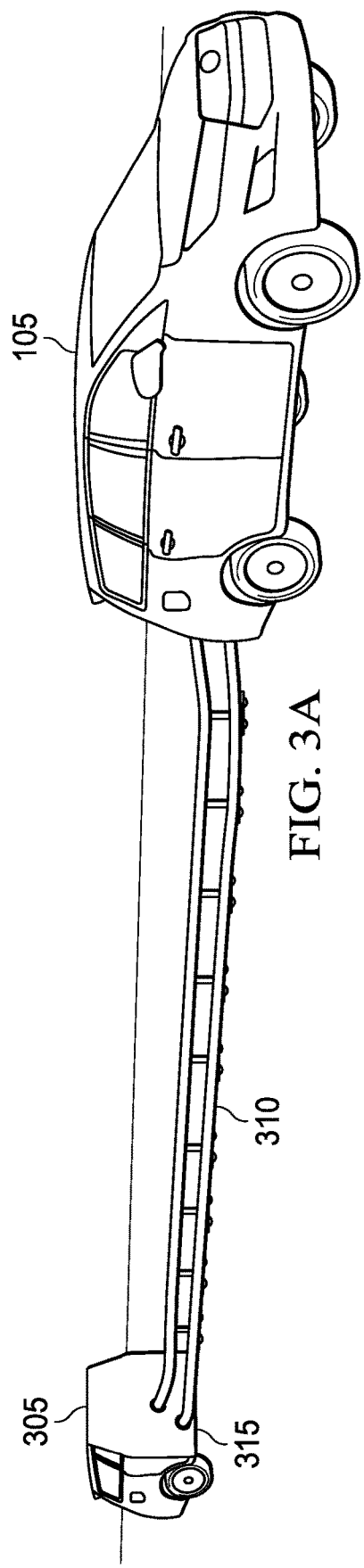
FIG. 3A is a perspective view of an inflatable decoy vehicle being towed by a control vehicle, in accordance with at least one embodiment of the present disclosure.

FIG. 3A is a perspective view of an inflatable decoy vehicle 305 being towed by a control vehicle 105, in accordance with at least one embodiment of the present disclosure. The inflatable decoy vehicle 305 is towed by the control vehicle 105 using a towing and inflation apparatus 310 and a wheeled scooter or dolly 315 positioned underneath the inflatable decoy vehicle 305. Such an arrangement may be used for example on a vehicle test track to test AFB systems and other autonomous and driver-assist features of a vehicle.

Figure 3B:
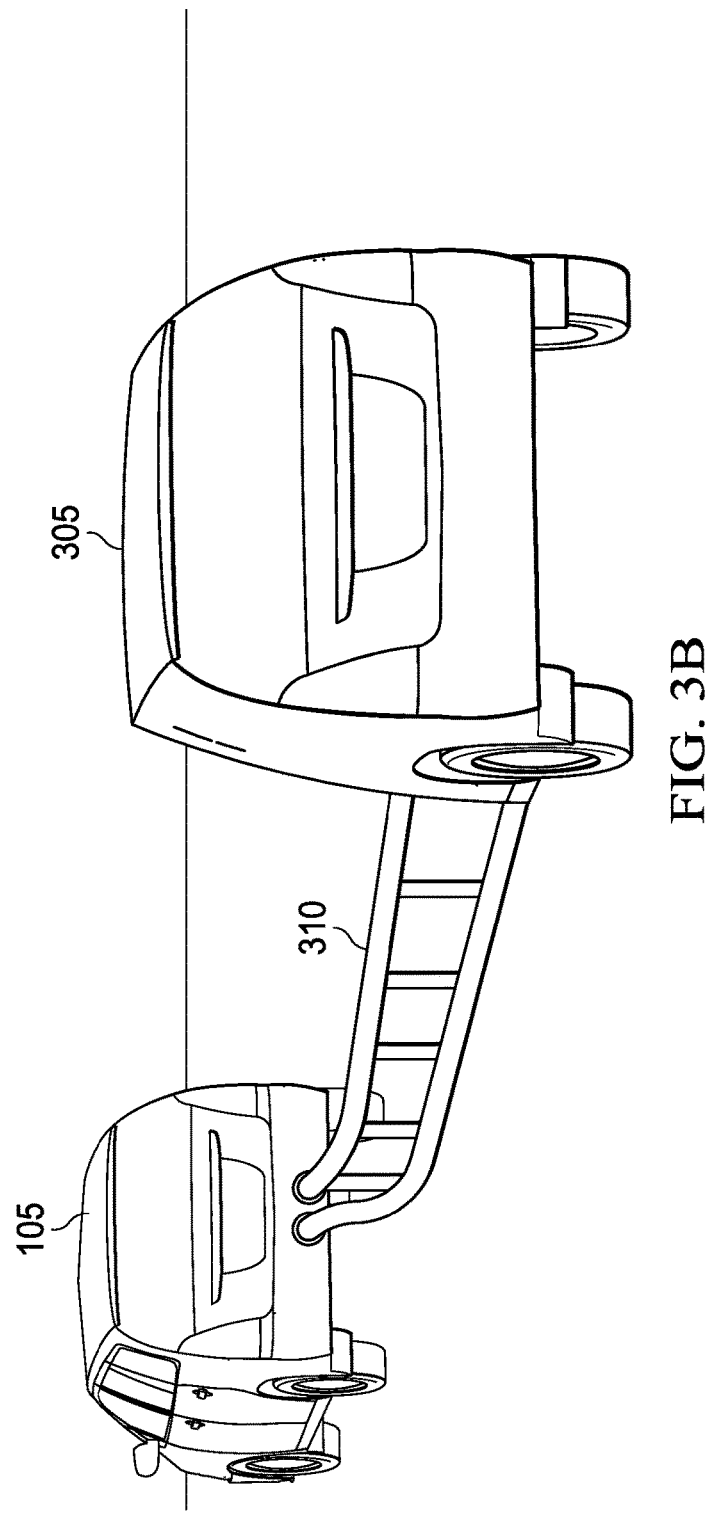
FIG. 3B shows a view of the control vehicle, towing and inflation apparatus, and inflatable decoy vehicle of FIG. 3A as they might appear to a third vehicle approaching from the rear, in accordance with at least one embodiment of the present disclosure.

FIG. 3B shows a view of the control vehicle 105, towing and inflation apparatus 310, and inflatable decoy vehicle 305 of FIG. 3A as they might appear to a third vehicle (not pictured) that is approaching from the rear, in accordance with at least one embodiment of the present disclosure. In the example shown in FIG. 3, the decoy vehicle 305 has an overall shape, color, and patterning that resemble the rear of an actual vehicle. Thus, autonomous and driver-assist features of the approaching vehicle (e.g., AFB systems) are likely to detect the decoy vehicle as an actual vehicle, and respond appropriately. For example, if an AFB system of the approaching vehicle detects that a collision with the decoy vehicle is imminent, the AEB system may initiate braking in order to avoid contact with the decoy vehicle, or reduce the speed of contact if contact cannot be avoided.

The towing and inflation apparatus 310 may for example provide continuous pressure to keep the decoy vehicle 305 fully inflated. The use of inflatable decoy vehicles permits, for example, the AFB system of a following vehicle to be tested with minimal risk of the following vehicle colliding with an actual vehicle. Rather, if the following vehicle's AEB fails to stop the following vehicle in time to avoid a collision, the following vehicle will collide with the inflatable decoy vehicle, resulting in minimal or no damage to the following vehicle.

Figure 4:
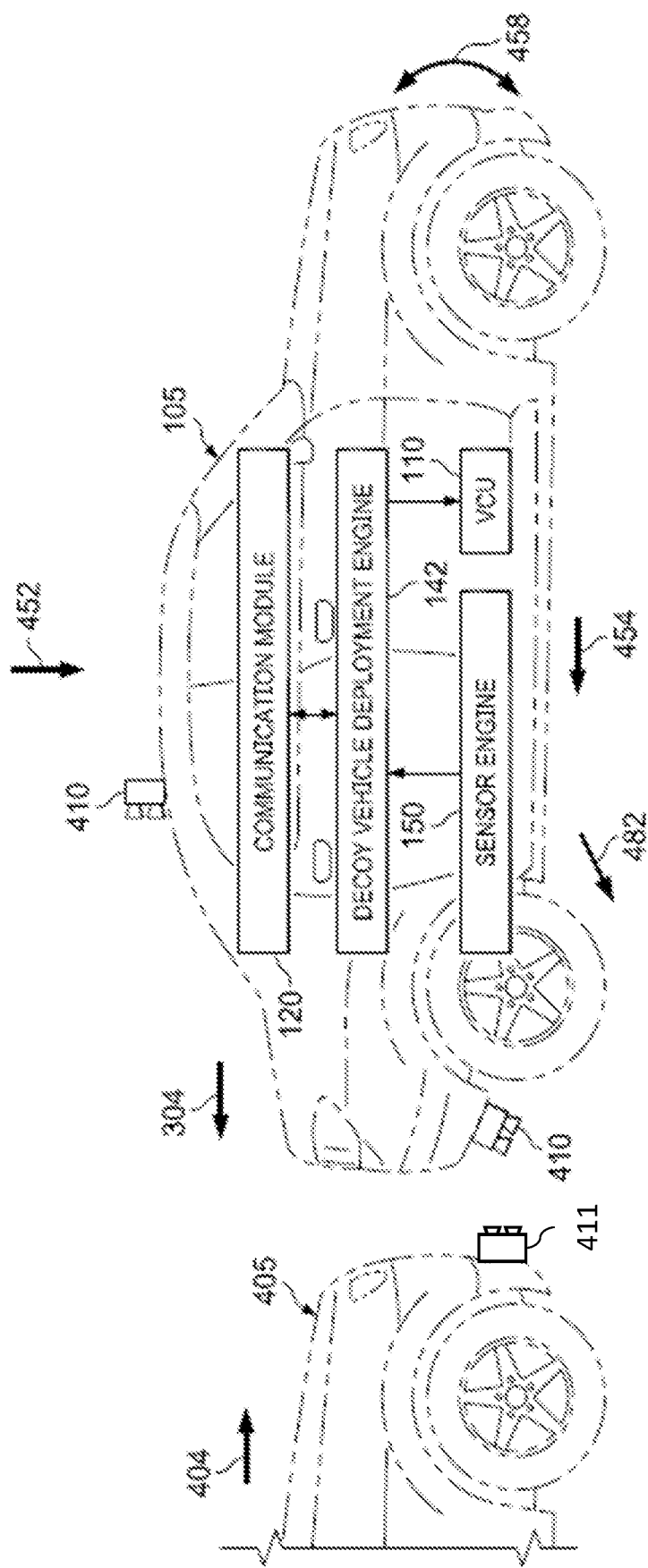
FIG. 4 is a diagrammatic illustration of an example deployable decoy vehicle system of an ego vehicle in accordance with at least one embodiment of the present disclosure.

FIG. 4 is a diagrammatic illustration of an example deployable decoy vehicle system 100 of an ego vehicle 105 in accordance with at least one embodiment of the present disclosure. In this implementation, for clarity, only certain engines are shown. However, other engines or system, including those describe herein, are also contemplated as being a part of the vehicle shown in FIG. 4. In the example shown, within the vehicle 105 the VCU 110, sensor engine 150, and communications module 120 are in communication with a decoy vehicle deployment engine 142 that is capable of performing additional operations specific to sensing and responding to an imminent collision, such as a rear-end, broadside, or T-bone collision.

An imminent collision may be predicted if, for example, the speed, acceleration, or deceleration 404 of an approaching vehicle 405 indicate that a distance between the approaching vehicle and the ego vehicle will reach zero within a specified time period (e.g., within one second, or within the sum of a predicted human reaction time and braking time). Such a calculation also depends on the motion of the ego vehicle. Force variables that may affect the motion of the ego vehicle 105 include but are not limited to the vehicle absolute weight 452, vehicle rolling friction 454, vehicle aerodynamic drag 304, vehicle pitch 458, and total rolling resistance 482. Force variables may be expressed in 1 bf, Newtons, or any other unit of force as desired. In some embodiments, one or more of these force variables are measured, calculated, estimated, or looked up by a control unit (e.g., VCU 110).

The decoy vehicle deployment engine 142 receives data from one or more sensors 410 positioned on the ego vehicle 105. This sensor data may include camera, radar, sonar, lidar, or other spatial data sufficient to determine the distance and velocity or acceleration between the approaching vehicle 405 and the ego vehicle 105. In some embodiments, the decoy vehicle deployment engine 142 may construct a 1D, 2D, or 3D model that includes at least the following vehicle 405 and the ego vehicle 105, or may compute a time-to-collision variable. When the time-to-collision variable falls below a threshold value (e.g., 1.0 seconds), or when the model otherwise indicates that a collision is imminent, the deployable decoy vehicle system of the ego vehicle may deploy an inflatable decoy vehicle, as shown below. Also visible is a sensor 411 on the approaching vehicle 405.

Figure 5:
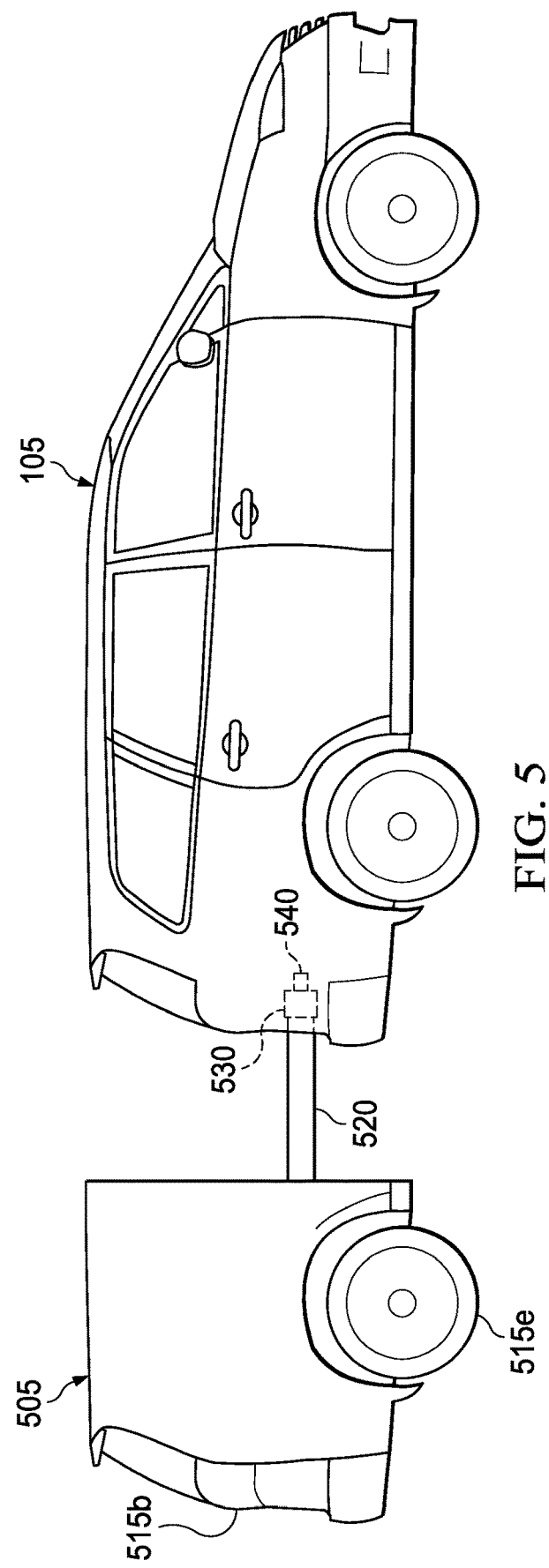
FIG. 5 is a side view of an ego vehicle that has deployed an inflatable decoy vehicle, in accordance with at least one embodiment of the present disclosure.

FIG. 5 is a side view of an ego vehicle 105 that has deployed an inflatable decoy vehicle 505, in accordance with at least one embodiment of the present disclosure. The inflatable decoy vehicle 505 may be an external airbag extending from an outer surface of the ego vehicle. A such, it may be capable of absorbing, deflecting, or dissipating at least some energy from a collision with a vehicle or other object. In the example shown in FIG. 5, the inflatable decoy vehicle has a shape, color, and patterning that resembles a rear portion of the ego vehicle, including images or structures 515e resembling tires, and images or structures 515b that resemble tail lights, bumpers, and other exterior vehicle features, such that from a vantage point behind the ego vehicle 105, the inflatable decoy vehicle 505 appears to be the ego vehicle 105. For example, the inflatable decoy vehicle may, to a sensor or processor on an approaching vehicle, be recognizable as a portion of the solid structure of the ego vehicle. In some embodiments, the inflatable decoy vehicle 505 may be recognizable as a vehicle different from the ego vehicle, or a portion thereof, without departing from the spirit of the present disclosure. In some embodiments, the inflatable decoy vehicle is configured to resemble a solid portion of the structure of a vehicle as interpreted by a camera, a radar, a lidar, a sonar, or other appropriate sensor on the approaching vehicle, or a processor in communication therewith. Such a rear-facing decoy vehicle 505 may be useful for example in preventing or mitigating rear collisions between the ego vehicle and the approaching vehicle.

In some embodiments, prior to deployment, the inflatable decoy vehicle 505 is stored in a compartment 530 within the vehicle (e.g., behind the vehicle bumper), and when an imminent collision is detected, the decoy vehicle 505 can be inflated by an inflator 540. In an example, the inflator 540 is a standard airbag inflator (e.g., a sodium azide inflator) sized to fully inflate the decoy vehicle 505. This permits the decoy vehicle to be stored unobtrusively until needed, but to be deployable very rapidly (e.g., within 100 milliseconds or less) when an imminent collision is detected.

In some embodiments, the fully deployed inflatable decoy vehicle 505 is connected to the compartment 530 by an inflatable stalk 520. The inflatable stalk 520 permits the decoy vehicle 505 to be farther back from the rear of the ego vehicle 105, thus positioning it closer to an approaching vehicle with the intention of triggering, earlier, a response from the approaching vehicle, such as triggering of the approaching vehicle's automated emergency braking system, or automated evasive maneuvers, or other automated response, or manual braking or evasive maneuvers by a human driver. In some embodiments, the length of the stalk 520 can affect how far back from the ego vehicle 105 the decoy vehicle 505 appears to be. Thus, a slightly longer stalk 520 may result in slightly earlier triggering of the approaching vehicle's AEB, while a slightly shorter stalk 520 may result in slightly later triggering of the approaching vehicle's AEB.

Figure 6:
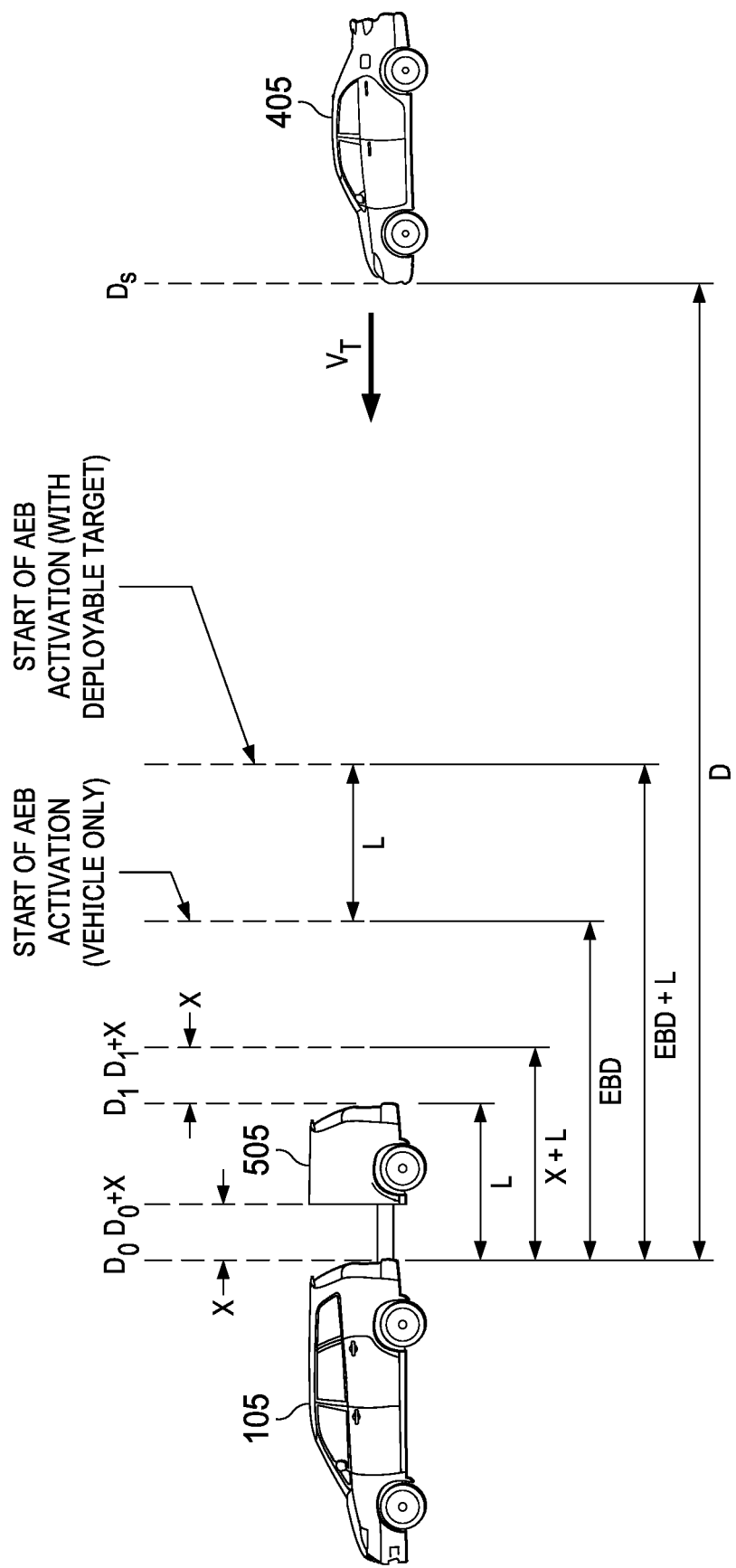
FIG. 6 is a schematic side view of an ego vehicle that has deployed an inflatable decoy vehicle in response to an approaching vehicle with a velocity $V_T$, in accordance with at least one embodiment of the present disclosure.

FIG. 6 is a schematic side view of an ego vehicle 105 that has deployed an inflatable decoy vehicle 505 in response to an approaching vehicle 405 with a velocity VT, in accordance with at least one embodiment of the present disclosure. Do represents the rear of the ego vehicle. $D_1$ represents the rear of the deployable inflatable target. X represents a theoretical or predicted stopping distance target for the approaching vehicle 405. L represents the length of the inflatable decoy vehicle 505. $D_S$ represents a starting position of the approaching vehicle 405. D represents a variable distance between $D_0$ and $D_S$. EBD represents a theoretical or predicted distance from $D_0$ at which the automatic emergency braking (AEB) of the approaching vehicle 405 will be activated if a collision is imminent, and if no other countermeasures are taken. "Imminent" may mean for example that a collision is predicted to occur within a specified time interval, such as 1.0 seconds, 1.4 seconds, or an anticipated reaction time and braking time of the approaching vehicle.

When the ego vehicle 105 deploys the inflatable decoy vehicle 505, the approaching vehicle will now detect the rear of the decoy vehicle 505 as though it were the rear of the ego vehicle 105, and will therefore initiate AEB at a distance of EBD+L rather than a distance of EBD. This will shift the stopping distance of the approaching vehicle 405 from position $D_0$+X to position $D_1$+X, which is also equal to X+L. This in turn causes the approaching vehicle 405 to stop farther from the ego vehicle 105, as shown below, or to collide with the ego vehicle at a lower velocity than it otherwise would have. VA represents the amount of this velocity reduction.

Figure 7:
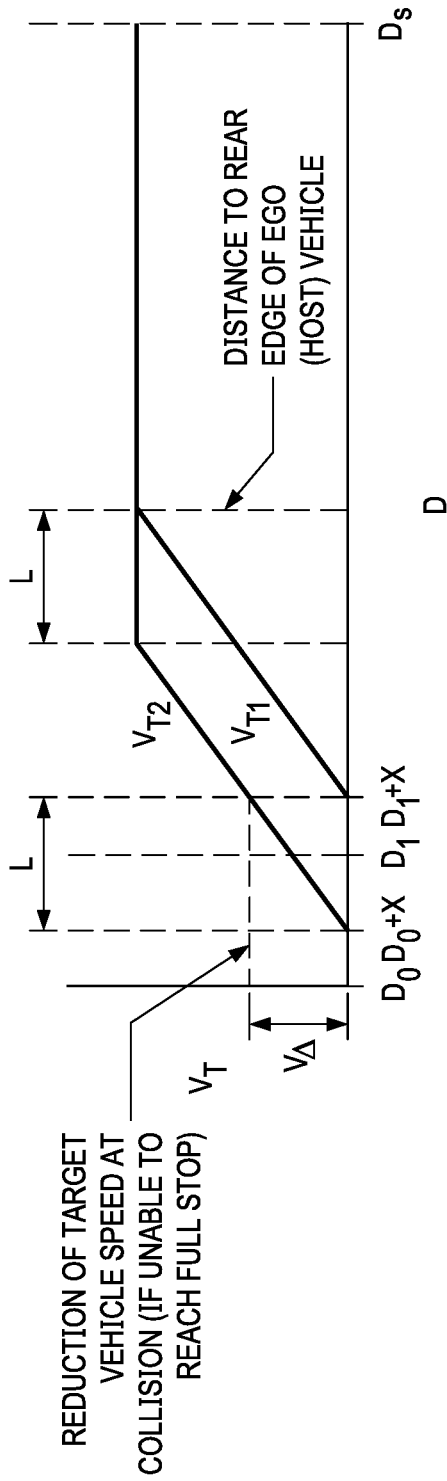
FIG. 7 is a graph representing the velocity of the approaching vehicle of FIG. 6, as a function of distance during automatic emergency braking, in accordance with at least one embodiment of the present disclosure.

FIG. 7 is a graph representing the velocity VT of the approaching vehicle of FIG. 6, as a function of distance D from position $D_0$, the rear of the ego vehicle, during automatic emergency braking (AEB), in accordance with at least one embodiment of the present disclosure. In the $VT_2$ case, with no countermeasure, velocity $VT_2$ begins at a constant value and then declines to zero at a distance of $D_0+X$. In the $VT_1$ case, with the inflatable decoy vehicle deployed behind the ego vehicle, velocity $VT_1$ begins at a constant value and then declines to zero at a distance of $D_1+X$, or $D_0+X+L$. This earlier braking may reduce the chance of an inadvertent collision between the approaching vehicle and the ego vehicle or, if a collision cannot be avoided, may reduce the speed of impact.

Figure 8:
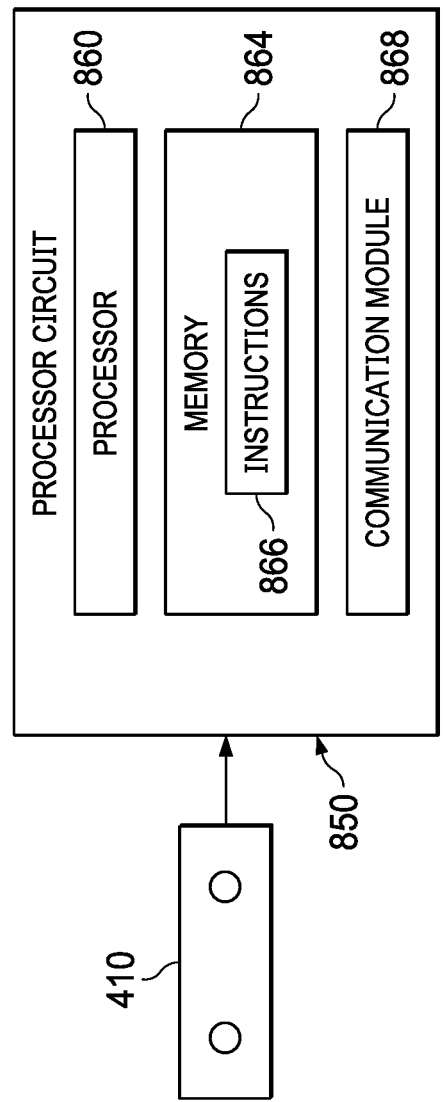
FIG. 8 is a diagrammatic illustration of a processor circuit, according to embodiments of the present disclosure.

FIG. 8 is a diagrammatic illustration of a processor circuit 850, according to embodiments of the present disclosure. The processor circuit 850 may be implemented in the deployable decoy vehicle system 100, VCU 110, portable device 300, or other devices or workstations (e.g., third-party workstations, network routers, etc.), or on a cloud processor or other remote processing unit, as necessary to implement the method. As shown, the processor circuit 850 may include a processor 860, a memory 864, and a communication module 868. These elements may be in direct or indirect communication with each other, for example via one or more buses.

The processor 860 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 860 may also comprise another hardware device, a firmware device, or any combination thereof configured to perform the operations described herein. The processor 860 may also be implemented as a combination of computing devices, e.g., a combination of a DSP and a microprocessor, a plurality of microprocessors, one or more microprocessors in conjunction with a DSP core, or any other such configuration.

The memory 864 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 864 includes a non-transitory computer-readable medium. The memory 864 may store instructions 866. The instructions 866 may include instructions that, when executed by the processor 860, cause the processor 860 to perform the operations described herein. Instructions 866 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 868 can include any electronic circuitry and/or logic circuitry to facilitate direct or indirect communication of data between the processor circuit 850, and other processors or devices. In that regard, the communication module 868 can be an input/output (I/O) device. In some instances, the communication module 868 facilitates direct or indirect communication between various elements of the processor circuit 850 and/or the deployable decoy vehicle system 100. The communication module 868 may communicate within the processor circuit 850 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and a central server, or readings from the sensors) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

In the example shown in FIG. 8, the processor circuit 850 receives sensor data from a sensor 410.

As will be readily appreciated by those having ordinary skill in the art after becoming familiar with the teachings herein, the deployable decoy vehicle system advantageously protects the ego vehicle from collision by an approaching vehicle, both by tricking the approaching vehicle into braking earlier, and by cushioning any impact that does occur. A number of variations are possible on the examples and embodiments described above. For example, deployable decoy vehicle can vary in size, shape, position, speed of deployment, or deployment mechanism without departing from the spirit of the present disclosure. Multiple deployable decoy vehicles may be provided in a single ego vehicle. The technology described herein may be applied to myriad different vehicle types, including internal combustion, electric, and hybrid vehicles, cars, trucks, motorcycles, and other vehicles.

The logical operations making up the embodiments of the technology described herein are referred to variously as operations, steps, objects, elements, components, or modules. It should be understood that these may be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the deployable decoy vehicle system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the deployable decoy vehicle system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising:
   a compartment disposed within the vehicle;
   an inflator disposed within the vehicle; and
   an airbag configured as a decoy vehicle, wherein the airbag is stored within the compartment and inflatable by the inflator,
   wherein, when the airbag is inflated, the decoy vehicle:
      extends from an outer surface of the vehicle,
      comprises a shape recognizable, to a sensor and collision detection system on an approaching second vehicle, as at least a portion of a solid structure of the vehicle, and
      is configured to absorb at least some energy from a collision between the vehicle and the approaching second vehicle.

2. The vehicle of claim 1, wherein the sensor comprises a processor.

3. The vehicle of claim 1, wherein the sensor comprises a radar.

4. The vehicle of claim 1, wherein the sensor comprises a lidar or sonar.

5. The vehicle of claim 4, wherein a coloration or patterning of the inflated airbag is recognizable, to the sensor, as at least the portion of the solid structure of the vehicle.

6. The vehicle of claim 1, wherein the sensor comprises a camera.

7. The vehicle of claim 1, wherein the inflator is activated by a second sensor located on the vehicle.

8. The vehicle of claim 1, wherein the inflator is activated by a processor located on the vehicle in communication with a second sensor located on the vehicle.

9. The vehicle of claim 8, wherein the inflator is activated by the processor when the processor predicts that the collision between the vehicle and the approaching second vehicle will occur within a specified time.

10. The vehicle of claim 1, wherein the shape, recognizable to the sensor on the approaching second vehicle as at least the portion of the solid structure of the vehicle, is configured to trigger an automated response of the approaching second vehicle via the sensor on the approaching second vehicle.

11. The vehicle of claim 10, wherein the automated response is an emergency braking response.

12. The vehicle of claim 1, wherein, when inflated, the airbag comprises a radar signature recognizable, to a sensor on an approaching second vehicle, as at least a portion of a solid structure of the vehicle.

13. A system for protecting a vehicle, the system comprising:
   the vehicle;
   a sensor disposed within the vehicle;
   a processor in communication with the sensor;
   a compartment disposed within the vehicle;
   an inflator disposed within the vehicle and configured to be activated by the processor; and
   an airbag configured as a decoy vehicle, wherein the airbag is stored within the compartment and inflatable by the inflator,
   wherein, when the airbag is inflated, the decoy vehicle:
      extends from an outer surface of the vehicle,
      comprises a shape recognizable, to a second sensor on an approaching second vehicle and a collision detection system on the approaching second vehicle, as at least a portion of a solid structure of the vehicle, and
      is configured to absorb at least some energy from a collision between the vehicle and the approaching second vehicle.

14. The system of claim 13, wherein the second sensor comprises a second processor.

15. The system of claim 13, wherein the second sensor comprises a radar, lidar, sonar, or camera.

16. The system of claim 13, wherein a coloration or patterning of the inflated airbag is recognizable, to the second sensor, as at least the portion of the solid structure of the vehicle.

17. The system of claim 13, wherein the inflator is activated by the processor when the processor predicts that the collision between the vehicle and the approaching second vehicle will occur within a specified time.

18. The system of claim 13, wherein the shape recognizable to the second sensor is configured to trigger an automated response of the approaching second vehicle via the second sensor.

19. The system of claim 18, wherein the automated response is an emergency braking response.

20. A vehicle external airbag deployable by a road vehicle and configured as a decoy vehicle shape recognizable to a sensor located on a second road vehicle as a solid structure of a vehicle.

* * * * *